United States Patent [19]

Redlich et al.

[11] Patent Number: 4,531,207

[45] Date of Patent: Jul. 23, 1985

[54] RECORD CUTTING STYLUS ASSEMBLY

[75] Inventors: Horst Redlich; Heinz Stahlbaum, both of Berlin, Fed. Rep. of Germany

[73] Assignee: TELDEC Schallplatten GmbH, Hamburg, Fed. Rep. of Germany

[21] Appl. No.: 541,661

[22] Filed: Oct. 13, 1983

[30] Foreign Application Priority Data

Oct. 13, 1982 [DE] Fed. Rep. of Germany ....... 3237908

[51] Int. Cl.³ .............................................. G11B 3/50
[52] U.S. Cl. .................................................... 369/173
[58] Field of Search ............... 369/173, 171, 172, 170, 369/154, 155, 138, 132; 125/39, 35; 51/229, 216 LP; 76/DIG. 12, 82

[56] References Cited

U.S. PATENT DOCUMENTS

| 1,252,843 | 1/1918 | Rintelman | 369/171 |
| 2,286,178 | 6/1942 | Kornei | 369/171 |
| 3,466,813 | 9/1969 | Leibowitz | 51/229 |

FOREIGN PATENT DOCUMENTS

| 584413 | 9/1933 | Fed. Rep. of Germany . | |
| 677800 | 7/1939 | Fed. Rep. of Germany . | |
| 1180156 | 10/1964 | Fed. Rep. of Germany | 369/173 |
| 2319407 | 11/1974 | Fed. Rep. of Germany . | |
| 548588 | 10/1922 | France | 125/39 |
| 615836 | 1/1927 | France . | |
| 632546 | 7/1928 | France | 125/39 |

OTHER PUBLICATIONS

Zdenek Smida, "Diamond Tools in Precision Engineering", Industrial Diamond Review, 23(1963.08)273, pp. 188–192.

IBM Technical Disclosure Bulletin, vol. 17, No. 10, Mar. 1975, Grandia et al., "Diamond Burnishing Tool", p. 3009.

Primary Examiner—Steven L. Stephan
Attorney, Agent, or Firm—Spencer & Frank

[57] ABSTRACT

A stylus assembly for cutting information in a recording medium comprises a stylus having a leading face; a mount comprising a bar having a groove extending in a face of the bar generally parallel to the length dimension of the bar. The stylus is received in the groove such that the leading face of the stylus is oriented away from the groove and slightly projects therebeyond in its entirety.

8 Claims, 10 Drawing Figures

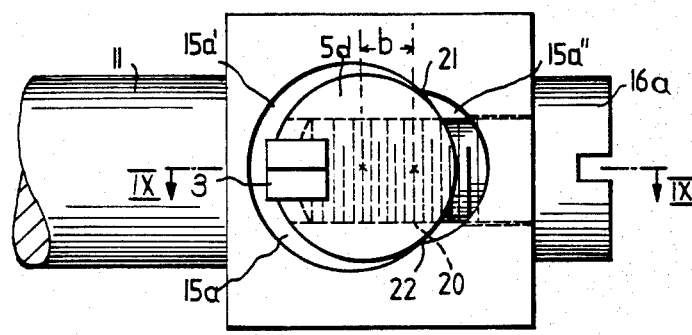
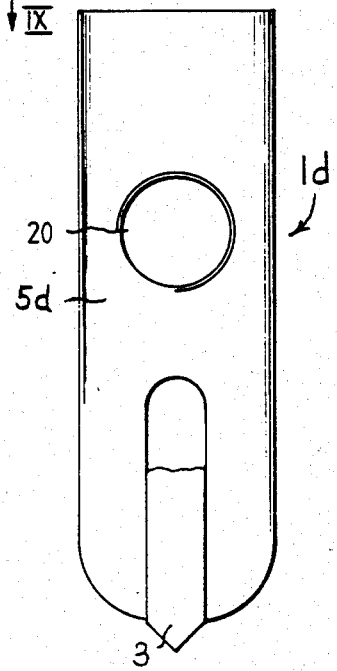
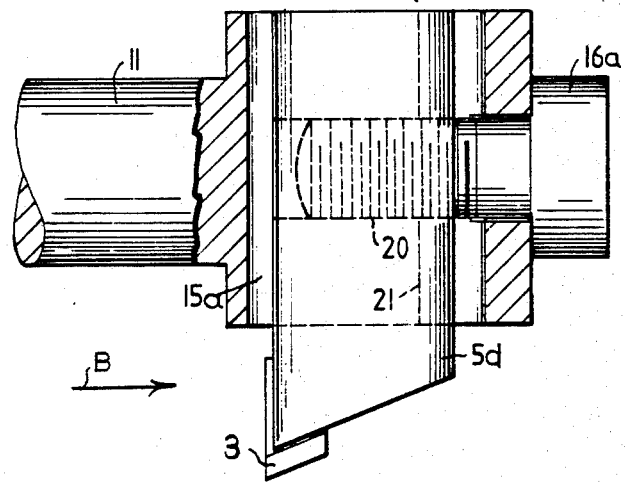

RECORD CUTTING STYLUS ASSEMBLY

BACKGROUND OF THE INVENTION

This invention relates to a record cutting stylus assembly, particularly a stylus mount for a diamond stylus.

For cutting information into a recording blank (lacquer foil) for a phonograph record, usually a sapphire stylus glued or embedded into a mount is used which is electromechanically excited with the intermediary of the mount. It is also known to use diamond styli for the same purpose. If, instead of a lacquer foil, copper is used as the material for the record carrier then, for cutting the information, the hardness of a sapphire stylus is no longer sufficient due to the cutting resistance of the copper layer and thus, under such circumstances the use of a diamond stylus is a requirement.

In the known stylus assemblies the sapphire or diamond stylus is positioned in a tubular mount and is glued or soldered thereto. While a worn sapphire stylus is usually replaced by a new one, worn diamond styli are, because of economic reasons, reground or repolished after a predetermined wear. Such a reconditioning of a stylus, however, is a relatively complex process with conventional stylus assemblies.

SUMMARY OF THE INVENTION

It is an object of the invention to provide an improved stylus assembly which permits a simple regrinding or repolishing of the stylus.

This object and others to become apparent as the specification progresses, are accomplished by the invention, according to which, briefly stated, the stylus assembly includes a mount which comprises a bar provided with a lateral, trough-like groove and a stylus which is received in the groove such that the leading face of the stylus just slightly projects beyond the groove.

The stylus mount according to the invention permits a repolishing of the stylus without the need of removing it from the mount. By means of the particular arrangement of the stylus in the mount, the leading face of the stylus, that is, the surface of the stylus which is oriented towards the cutting direction and bounded by the cutting edge, is freely exposed in its entirety above the mount. This means that for repolishing the leading face, the stylus need not be removed from its mount. By means of the particular construction of the mount according to the invention, there is achieved an improved seat for the stylus in the mount as compared to prior art arrangements. It is a further advantage of the mount according to the invention that the stylus can be securely fastened in the socket of a recording head or recording arm. Such a firm support of the stylus assembly is of importance when a metal surface is cut, particularly if the stylus executes oscillations in the ultrasonic frequency range during the cutting operation.

BRIEF DESCRIPTION OF THE DRAWING

FIG. 8 is a bottom plan view of a further preferred embodiment of the invention, received in a stylus socket of a record cutting head.

FIG. 9 is a sectional view taken along line IX—IX of FIG. 8.

FIG. 10 is a top plan view of the preferred embodiment illustrated in FIGS. 8 and 9.

DESCRIPTION OF THE PRIOR ART

Figure 1:
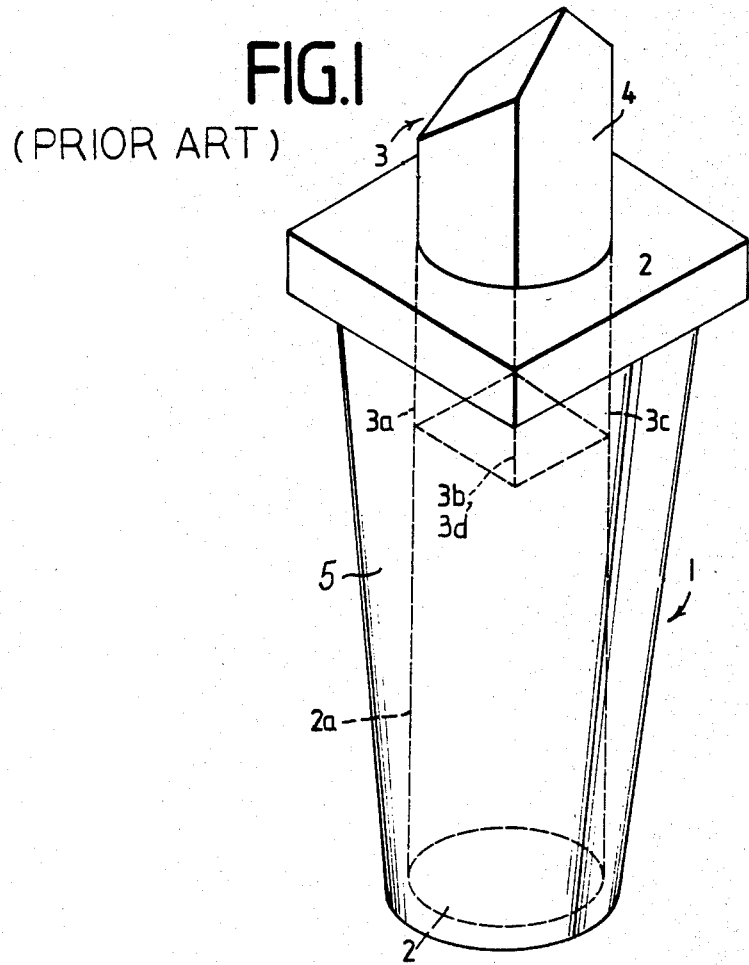
FIG. 1 is a perspective view of a prior art construction.

Turning now to FIG. 1, there is illustrated a stylus assembly according to the prior art. The stylus assembly includes a mount 1 formed of a conically tapering tube 5, having a longitudinal bore 2 into which a stylus 3 is inserted. Since the cross-sectional surface of a conventional stylus is rectangular, the four edges 3a, 3b, 3c and 3d of the stylus 3 engage the cylindrical wall 2a of the bore 2. In case the cross-sectional surface of the stylus such as a diamond or sapphire, is not precisely quadratic, it is conceivable that only three of the four edges will engage the inner wall face 2a. It is also conceivable that the diagnosis of the cross section of the stylus 3 are smaller than the diameter of the bore 2. In order to ensure that the stylus 3 is firmly anchored in the bore 2, it is therefore necessary to glue or solder the stylus into the mount tube 5. This, in turn requires that the stylus 3 be introduced relatively far into the bore 2.

If the end of the service period of the cutting stylus is reached (thus, the stylus has become worn) it is, in most cases, removed and replaced with a new stylus. If a diamond stylus is used, it would be economically prohibitive to replace a worn stylus in each instance. Therefore, diamond styli are reground are repolished. For this purpose, the diamond stylus 3 is removed from the mount 1 and clamped into a special chuck whereupon a regrinding or repolishing operation is performed on the leading face 4. By the leading face there is meant the stylus surface against which the material to be cut is forced, that is, the surface on which the cut chips slide off. Subsequent to a regrinding or repolishing step, the stylus 3 is refitted into the mount 1 and is ready for use. Such a process, however, is relatively complex. The invention, to be described in connection with FIGS. 2 through 10, eliminates such a disadvantage inherent in the known stylus assemblies.

DESCRIPTION OF THE PREFERRED EMBODIMENTS

Figure 2:
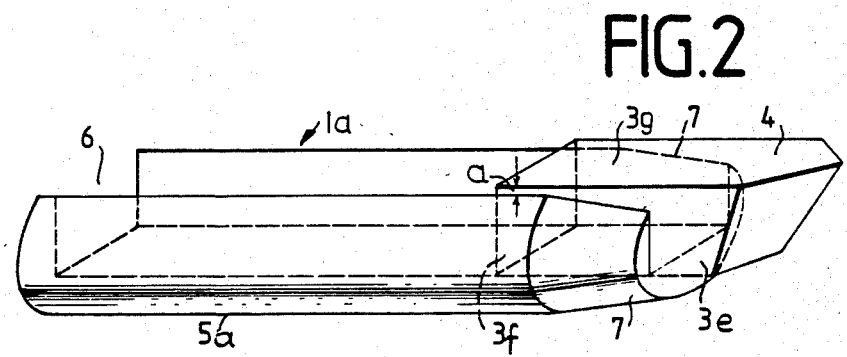
FIG. 2 is a perspective view of a preferred embodiment of the invention.

Turning now to FIG. 2, the preferred embodiment shown therein comprises a stylus mount 1a formed essentially of a mount bar 5a which has a length of approximately 5 mm and which, along its entire length, is provided with a groove 6 of rectangular cross section. A rectangularly cut diamond stylus 3 is inserted at one end portion of the groove 6. The groove 6 and the diamond stylus 3 are so dimensioned that the stylus 3 lies, with three faces 3e, 3f and 3g against respective side and bottom walls of the groove 6. The fourth surface of the stylus 3, namely, the leading face 4, is oriented 180° away from the open top face of the groove 6 and slightly projects therefrom by a height a. The leading face 4 extends forwardly to the triangular cutting tip of the stylus 3. By virtue of the face-to-face engagement of the three diamond faces 3e, 3f and 3g with the three wall faces of the groove 6, the seat of the diamond 3 is, upon gluing or soldering, much firmer in the mount 1a than in prior art structures as explained in connection with FIG. 1. By virtue of the increased holding force, the length portion of the stylus 3 received in the groove may be reduced.

The stylus assembly according to the invention eliminates the necessity of removing the stylus from the mount for regrinding the stylus. Instead, the stylus 3, together with the mount 1a is fitted into a grinding or polishing device and the leading face 4 may be reworked while the stylus 3 remains secured to the mount 1a. In this manner there may be achieved a very rapid removal, regrinding and reinsertion of the stylus assembly. The end 7 of the mount 1a oriented towards the stylus 3 has a conically shaped tip to ensure a relatively small-stepped transition between the mount 1a and the stylus 3. By virtue of the mount 1a illustrated in FIG. 2 the faces 3e, 3f and 3g of the diamond stylus 3 have, even before the first insertion of the stylus 3 into the groove 6, a precise position relative to the crystal grid, for example, relative to the natural edges of the inserted stylus 3. As known, such edges are significantly more wear-resistant than other edges obtained by grinding. These considerations are taken into account when the diamond stylus is cut. During the polishing process performed on a coordinated unit formed by the mount 1a, groove 6 and stylus 3, there is performed the machining of the leading face 4 in accordance with the natural crystal grid without the latter still being visible, because the four diamond faces maintain their position and thus the position of the groove 6 is a measure for the position of the natural edges or other lines of the crystal grid whose location is predetermined.

Figure 3:
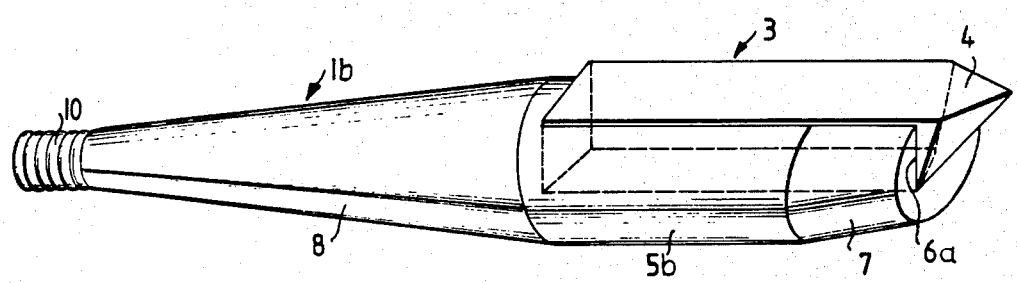
FIG. 3 is a perspective view of another preferred embodiment of the invention.
Figure 4:
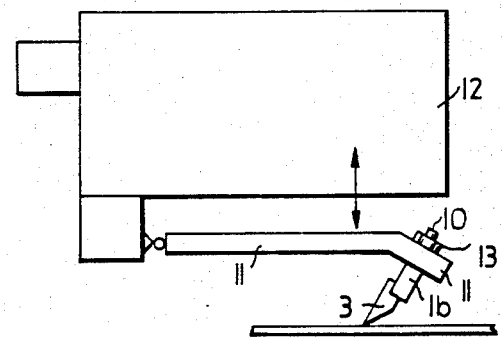
FIG. 4 is a schematic side elevational view of a record cutting head incorporating the invention.

Another preferred embodiment of the invention is illustrated in FIG. 3. The mount 1b has a groove 6a whose length is limited such that the diamond 3 fills the groove along the entire groove length. The mount 1b, in a zone 8 oriented away from the stylus 3, is of conical configuration to ensure a firm seating of the mount in a recording head. The end 10 of the mount bar 5b remote from the groove 6a is provided with an external thread. As shown in FIG. 4, the mount 1b inserted in an electromagnetically driven lever 11 of a recording head 12, may be secured by means of a nut 13 threadedly engaging the end 10 of the bar 5b. This mechanism ensures that the stylus assembly can be easily removed and installed and, in the installed state it is firmly supported for cutting a copper recording medium which places higher requirements on the stylus mount and for exposure to vibrations generated in particular in a recording process such as discussed in German Offenlegungsschrift (application published without examination) No. 3,114,108.

Figure 5:
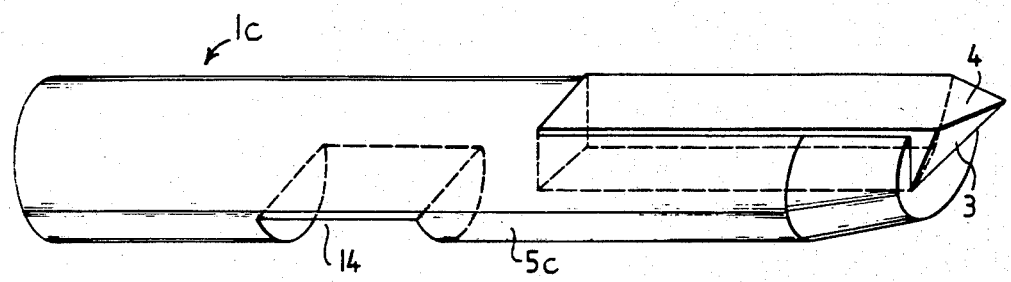
FIG. 5 is a perspective view of still another preferred embodiment of the invention.

FIG. 5 illustrates a further preferred embodiment of the invention. The mount according to the embodiment shown in FIG. 5 achieves a self-adjustment of the stylus position to the desired cutting direction while the mount is secured to the cutting head. The cylindrical mount bar 5c is provided with a depressed flat surface 14 which extends parallel to the leading face 4 of the stylus 3 and which is offset relative to the stylus 3 in the direction of that end of the bar 5c which is remote from the stylus 3. In this manner, the surface 14 may be utilized for the affixation of the stylus assembly in the cutting head without reducing the thickness of the bar 15 in the zone of the stylus 3.

Figure 6:
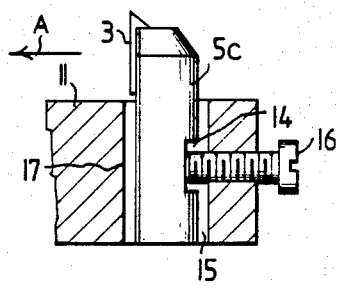
FIG. 6 is a sectional elevational view of a stylus socket and the FIG. 5 embodiment received therein.

Turning to FIG. 6, the cutting head 11 is provided with a socket opening 15 for accommodating the stylus assembly structured according to the FIG. 5 embodiment. The planar face 14 provided in the mount bar 5c is situated within the zone of the socket opening 15, while the stylus 3 is situated in its entirety externally thereof. The head 11 supports an externally accessible securing screw 16 which may be advanced radially into the socket opening 15 for abutting the surface 14 and thus urging the mount bar 5c against the oppositely located wall of the socket opening 15 for firmly positioning the stylus assembly even against violent jars.

Figure 7:
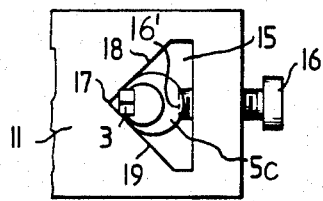
FIG. 7 is a top plan view of the structure illustrated in FIG. 6.

Turning now to FIG. 7, the socket opening 15 has a generally triangular cross-sectional configuration whose corner 17 is oriented in the cutting direction A. The screw 16 presses the mount bar 5c in the cutting direction, that is, against the corner 17. The adjoining sides 18 and 19 of the triangular socket opening 15 are so designed that the mount bar 5c may rotate relative thereto when the screw 16 is pressed, with its planar frontal face 16', against the surface 14 of the mount bar 5b. During the tightening of the screw 16 the mount bar 5c rotates about its longitudinal axis until the leading face of the screw 16 and the planar surface 14 are in a face-to-face engagement with one another. Since the surface 14 and the leading face 4 of the stylus 3 are oriented parallel, upon securement of the mount 1c with the screw 16, the stylus 3 is automatically turned into the desired cutting direction. Since in a diamond the hardest edges lie in relatively narrow zones (natural edges) which in the case of a ground diamond can no longer be easily recognized, such an automatic adjustment of the axial position of the diamond into the best cutting position is of great advantage. A designation of the cross-sectional shape of the socket opening as being triangular is intended to mean that the two sides 18 and 19 arranged at an oblique angle to one another serve as a countersupport for the mount bar of the stylus assembly and that the third side serves as a support for the tightening screw 16. It is thus not necessary that the cross-sectional configuration of the opening 15 be triangular in the strict geometrical sense.

Turning now to FIGS. 8, 9 and 10, there is shown a further embodiment of the invention. The socket opening 15a provided in the cutting head 11 accommodates a mount 1d which has a substantially cylindrical configuration and which has a threaded bore 20 extending perpendicularly to the longitudinal axis of the mount bar 5d. A setscrew 16a, supported in the cutting head 11 is screwed into the threaded bore 20 from the outside, whereby the screw 16a pulls the mount bar 5d against that internal wall portion of the socket opening 15a which supports the screw 16a. The socket opening 15a is formed by a relatively large bore 15a' and a relatively small bore 15a'' which are in a parallel, overlapping relationship whereby two engagement edges 21 and 22 are obtained which extend parallel to the length dimension (axis) of the socket opening 15a. In case of a symmetrical arrangement of the two engagement edges 21 and 22 and a symmetrical arrangement of the tightening screw 16a the mount 1d, upon tightening of the screw 16a, is set automatically such that the optimal cutting position is obtained. Since the pressure exerted on the stylus 3 during cutting of a recording medium is oriented, as indicated by the arrow B, against the engagement edges 21 and 22, the mount 1d will remain firmly seated in the socket opening 15a even in case of vibrations. The diameter of the bores 15a' and 15a" and the extent of overlap between these two bores are so designed that the distance b between the two axes of the bores 15a' and 15a" is greater than the radius of the smaller bore 15a".

It will be understood that the above description of the present invention is susceptible to various modifications, changes and adaptations, and the same are intended to be comprehended within the meaning and range of equivalents of the appended claims.

What is claimed is:

1. A stylus assembly, in combination with a cutting head, for cutting information in a recording medium, comprising
   (a) a mount including a bar having
      (1) a length dimension;
      (2) means defining a groove extending in a face of said bar generally parallel to said length dimension and having an open top face;
      (3) means defining a threaded bore extending perpendicularly to said length dimension;
   (b) a stylus having a leading face; said stylus being received in said groove such that said leading face is oriented substantially 180° away from said open top face of said groove and slightly projects therebeyond in its entirety; said leading face being oriented perpendicularly to said bore; said mount and said stylus forming said stylus assembly;
   (c) means defining a socket opening forming part of said cutting head; said socket opening receiving said stylus assembly;
   (d) means defining two parallel engagement edges within said socket opening; and
   (e) a setscrew supported in said cutting head and projecting into said socket opening in a direction coinciding with a cutting direction; said setscrew threadedly engaging into said bore of said bar and pulling said bar into a pressing contact with said engagement edges within said socket opening.

2. A stylus assembly as defined in claim 1, wherein said stylus is situated at an end portion of said bar and projects in said length dimension beyond a terminus of said end portion; said end portion of said bar being tapered towards said terminus.

3. A stylus assembly as defined in claim 1, wherein said stylus is a diamond stylus.

4. A stylus assembly as defined in claim 3, wherein said diamond stylus is so oriented with respect to said bar that the position of perpendicular cutting planes of said diamond stylus constitute a measure for the position of natural edges of said diamond stylus; said natural edges being invisible subsequent to diamond grinding.

5. A stylus assembly as defined in claim 1, wherein said groove has wall surfaces and further wherein said stylus is secured in said groove by a bond between the stylus and the wall surfaces.

6. A stylus assembly as defined in claim 5, wherein said bond is a soldered bond.

7. A stylus assembly as defined in claim 5, wherein said bond is a glued bond.

8. A stylus assembly, in combination with a cutting head, for cutting information in a recording medium, comprising
   (a) a mount including a bar having
      (1) a length dimension;
      (2) means defining a groove extending in a face of said bar generally parallel to said length dimension and having an open top face;
      (3) means defining a threaded bore extending perpendicularly to said length dimension;
   (b) a stylus having a leading face; said stylus being received in said groove such that said leading face is oriented substantially 180° away from said open top face of said groove and slightly projects therebeyond in its entirety; said leading face being oriented perpendicularly to said bore; said mount and said stylus forming said stylus assembly;
   (c) two parallel, overlapping socket bores defining a socket opening forming part of said cutting head; said socket opening receiving said stylus assembly;
   (d) two parallel engagement edges within said socket opening; said engagement edges being defined by the intersection of said overlapping socket bores; and
   (e) a setscrew supported in said cutting head and projecting into said socket opening in a direction coinciding with a cutting direction; said setscrew threadedly engaging into said bore of said bar and pressing said bar into contact with said engagement edges within said socket opening.

* * * * *